United States Patent
Potter

(10) Patent No.: US 8,251,015 B2
(45) Date of Patent: Aug. 28, 2012

(54) RECIRCULATING BIRDBATH

(76) Inventor: Stephen D. Potter, San Francisco, CA (US)

(*) Notice: Subject to any disclaimer, the term of this patent is extended or adjusted under 35 U.S.C. 154(b) by 1122 days.

(21) Appl. No.: 12/116,139

(22) Filed: May 6, 2008

(65) Prior Publication Data

US 2009/0277392 A1 Nov. 12, 2009

(51) Int. Cl.
*A01K 45/00* (2006.01)
*A01K 29/00* (2006.01)
(52) U.S. Cl. ..................... 119/69.5
(58) Field of Classification Search .......... 119/69.5, 119/72, 73, 74, 79, 80; D30/123; 4/651, 4/679–680; 239/20, 23
See application file for complete search history.

(56) References Cited

U.S. PATENT DOCUMENTS

| | | | | |
|---|---|---|---|---|
| 328,354 A | * | 10/1885 | Stears | 4/689 |
| 695,038 A | * | 3/1902 | Craig | 4/678 |
| 2,612,138 A | * | 9/1952 | Lindemann | 119/75 |
| 3,648,659 A | * | 3/1972 | Jones | 119/69.5 |
| 3,788,485 A | * | 1/1974 | Bruning | 210/474 |
| 3,995,591 A | * | 12/1976 | Garwood | 119/69.5 |
| 4,440,112 A | * | 4/1984 | Lilyerd | 119/73 |
| 4,640,226 A | | 2/1987 | Liff | |
| D353,230 S | * | 12/1994 | Reusche et al. | D30/123 |
| 5,692,454 A | | 12/1997 | Testa | |
| 5,784,998 A | * | 7/1998 | Manzer | 119/69.5 |
| 5,966,868 A | * | 10/1999 | Cox | 47/66.6 |
| 6,484,666 B1 | | 11/2002 | Reusche | |
| 6,634,316 B2 | | 10/2003 | Desatoff | |
| 6,640,747 B2 | * | 11/2003 | Reusche | 119/69.5 |
| 6,647,922 B1 | | 11/2003 | Travis | |
| 6,684,813 B1 | | 2/2004 | Lemon | |
| 2002/0117554 A1 | | 8/2002 | Lin | |

* cited by examiner

*Primary Examiner* — Rob Swiatek
*Assistant Examiner* — Ebony Evans
(74) *Attorney, Agent, or Firm* — QuickPatents, Inc.; Kevin Prince

(57) ABSTRACT

A birdbath is disclosed that recirculates water and includes a substantially hollow pedestal that supports a basin. The pedestal forms a water reservoir therein and has an open top end and a sealed bottom end. The basin has an inner wall and an outer wall, both of which are joined at least at a peripheral edge of the basin and separated by a distance sufficient to allow the water to flow therebetween. The outer wall is open at a central portion and is adapted for engaging the open top end of the pedestal for attaching the basin thereto. The inner wall has an aperture formed therethrough at a center portion thereof, and at least one drainage aperture formed proximate the peripheral edge of the basin. A water pump is disposed within the reservoir of the pedestal for pumping water from the reservoir through a basin supply conduit, through the aperture of the inner wall, and into the basin. Once the water reaches the at least one drainage aperture, it drains between the inner and outer walls, and flows through the central portion of the outer wall and back into the reservoir.

16 Claims, 2 Drawing Sheets

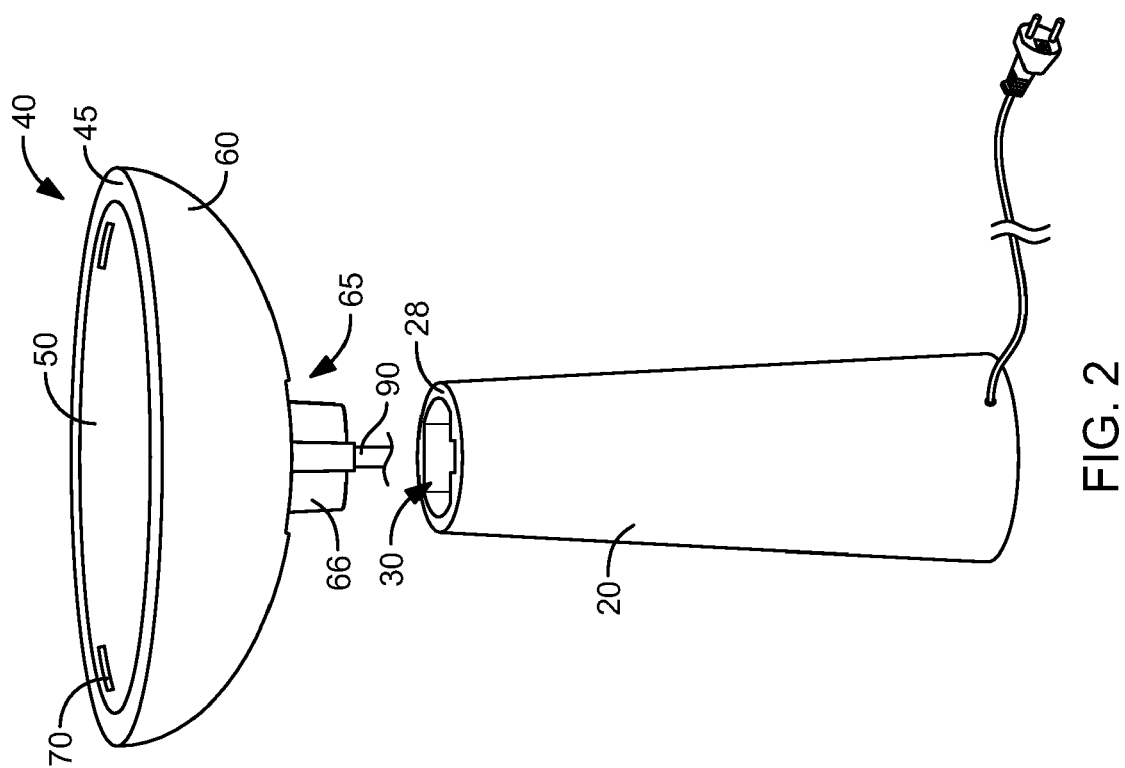
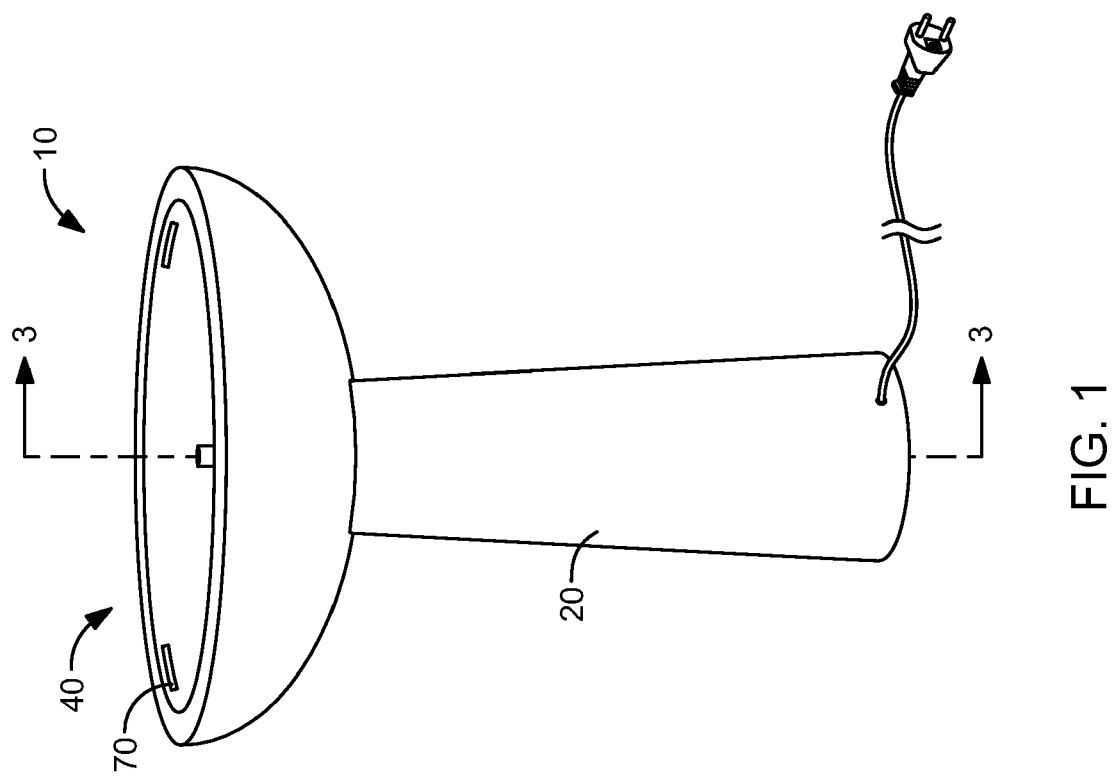

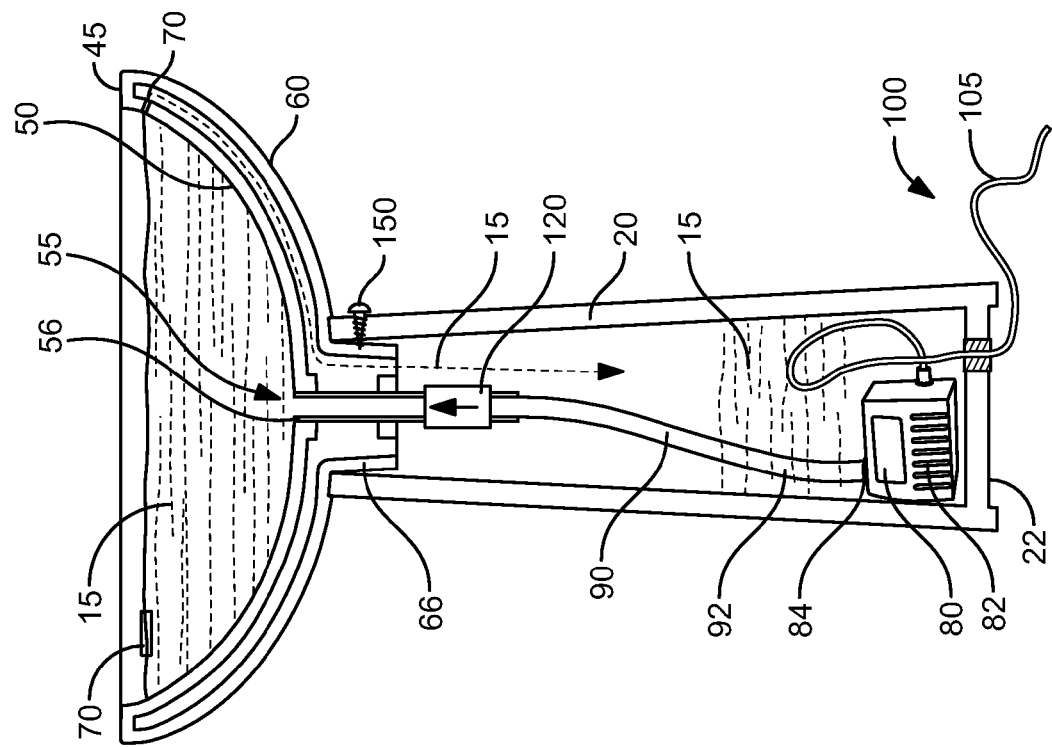
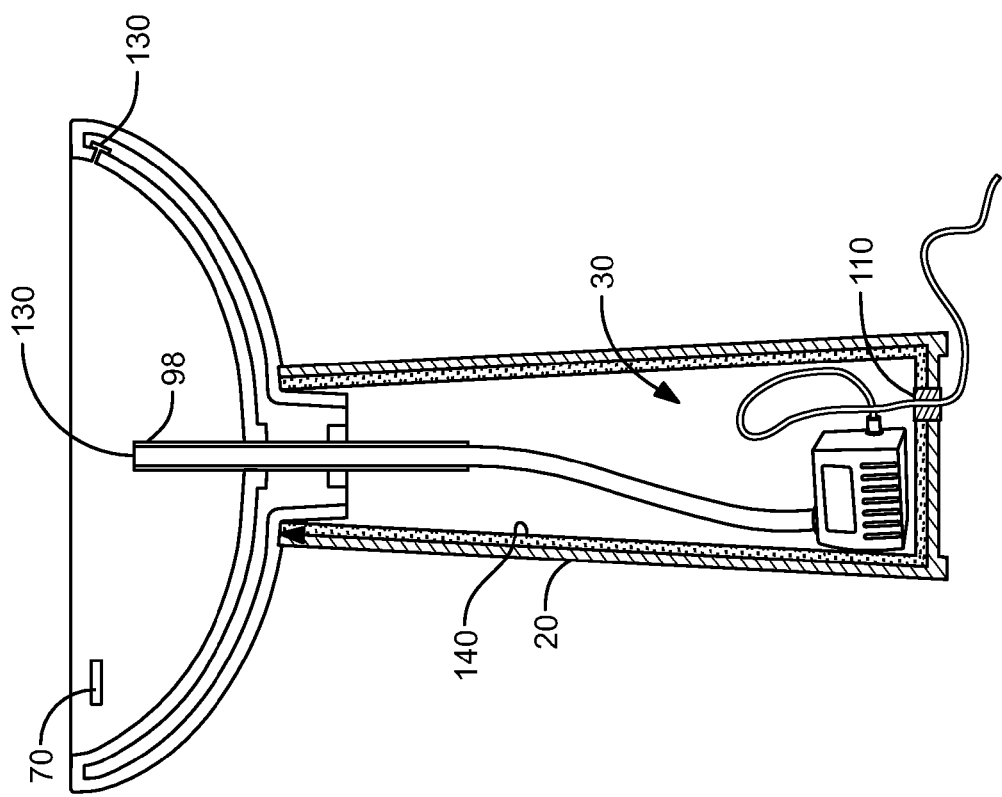

RECIRCULATING BIRDBATH

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to birdbaths, and more particularly to a recirculating birdbath.

DISCUSSION OF RELATED ART

Conventional birdbaths have the drawback that water in the basin of the birdbath is still and tends to stagnate over time, leading to mosquito infestation, algae, and other undesirable conditions. Further, in colder weather the water in birdbaths often freezes, rendering them useless for their designed purpose.

Several prior art birdbaths employ water pumps located in the basin to recirculate water. Recirculating the water in a birdbath reduces mosquito infestation, reduces algae buildup, and can also lower the effective freezing temperature of the water. However, water pumps sitting in the basin of a birdbath have the drawback that they are unsightly and encourage the construction of relatively deep basins so that the water will cover the water pump. Further, if the water level gets too low in the basin as water evaporates, the water pump can be damaged. A deeper reservoir is desirable to prevent the water pump from frequently running dry, yet birds favor shallow water in which to bath. Further, water pumps visible in the basin of such devices, even when covered, take away from the aesthetics of the device. Still further, birds also tend to prefer still or near still water. Many of the prior art devices, however, result in fairly turbulent water flow and includes water fountains and the like.

Other prior art birdbaths include a water pump located in a pedestal or base of the device, and typically such prior art devices include a water inlet port for introducing water into the basin, and a water outlet or return port for draining water from the basin. For example, U.S. Pat. No. 6,634,316 to Desatoff on Oct. 21, 2003; U.S. Pat. No. 5,692,454 to Testa on Dec. 2, 1997; and U.S. Pat. No. 6,484,666 to Reusche on Nov. 26, 2002 all teach such devices. Having only one outlet port, however, can lead to plugging of the outlet port with leaves and other debris, leading possibly to damage to the water pump and difficulty in regulating the depth of the water in the basin. Further, a single outlet port at the bottom of the birdbath basin often results in undesirable appearance and noise from whirlpools, and the inability to easily regulate the rate at which the birdbath drains.

The prior art birdbaths also suffer from the drawback that their mode of operation is essentially fixed. Some prior art devices with pumps, when turned-off, allow water to stay in the birdbath basin. Other prior art birdbaths, such as U.S. Pat. No. 6,684,813 to Lemon on Feb. 3, 2004, allow for draining of the basin into a reservoir. Yet none of the prior art devices allow for changing their mode of operation easily by adjusting the height of one conduit. Further, such devices tend to result in a relatively quick water drainage current being established in the basin, which is undesirable for birds that desire more stationary water. Still further, such devices require the use of a final or large central cover in the central section to house the sprinkler of the input port, which is aesthetically unpleasing and a deterrent for some birds.

Therefore, there is a need for a water-recirculating birdbath that has several easily changed modes of operation and in which the plumbing and mechanical devices are substantially not visible nor located in the basin. Such a needed device would provide for an insulated reservoir for all of the water in the device when a water pump of the device is deactivated, such as at night. Further, such a device would provide multiple basin drainage apertures and would therefore be resistant to occlusions thereof and easy regulation of the flow rate out of the basin based on water pump speed, not drainage aperture size. Such a device would be aesthetically pleasing in that a water pump thereof would be out-of-sight, virtually noiseless in operation, and would prevent mosquito infestation and algae buildup. The present invention accomplishes these objectives.

SUMMARY OF THE INVENTION

The present device is a birdbath that recirculates water and includes a substantially hollow pedestal that supports a basin. The pedestal forms a water reservoir therein and has an open top end and a sealed bottom end. The basin has an inner wall and an outer wall, both of which are joined at least at a peripheral edge of the basin and separated by a distance sufficient to allow the water to flow therebetween. The outer wall is open at a central portion and is adapted for engaging the open top end of the pedestal for attaching the basin thereto. The inner wall has an aperture formed therethrough at a center portion thereof, and at least one drainage aperture formed proximate the peripheral edge of the basin.

A water pump is disposed within the reservoir of the pedestal for pumping water from the reservoir through a basin supply conduit, through the aperture of the inner wall, and into the basin. Once the water reaches the at least one drainage aperture, it drains between the inner and outer walls, and flows through the central portion of the outer wall and back into the reservoir, where the water pump recirculates the water back into the basin.

The present device is a water-recirculating birdbath that has several easily changed modes of operation. The present device allows for an optionally insulated reservoir for all of the water in the basin when the water pump is deactivated, such as at night. Further, the present device includes multiple basin drainage apertures and is therefore be resistant to occlusions thereof, results in slower water flow, allows for the basin to be relatively shallow while at the same time facilitates the regulation of the water depth. As water evaporates, the water level in the basin remains constant. The present birdbath is aesthetically pleasing in that the water pump thereof is positioned out-of-sight within the pedestal, is virtually noiseless in operation, and inhibits mosquito infestation and algae buildup. Moreover, a water heater can be added in either the basin or the pedestal to prevent freezing of the water therein. The present device provides for relatively easy regulation of the flow rate of water out of the basin based on water pump speed, not drainage aperture size. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective view of a preferred embodiment of the invention;

FIG. 2 is an exploded perspective view of an alternate embodiment of the invention;

FIG. 3a is a cross-sectional view of the preferred embodiment of the invention, taken generally along lines 3-3 of FIG. 1; and FIG. 3b is a cross-sectional view of the alternate embodiment of the invention, taken generally along lines 3-3 of FIG. 1.

DETAILED DESCRIPTION OF THE PREFERRED EMBODIMENT

FIG. 1 illustrates a birdbath 10 that recirculates water 15 therein. The birdbath 10 includes a substantially hollow pedestal 20 that supports a basin 40. The pedestal 20 forms a water reservoir 30 therein and has an open top end 28 and a sealed bottom end 22. The pedestal 20 is formed from a substantially rigid material, such as plastic, epoxy resin, fiberglass, or the like. Further, the pedestal 20 may include an insulating material 140 (FIG. 3a), or be made from a material that is an effective heat insulator. As such, water 15 in the pedestal 20 is inhibited from freezing when stationary within the reservoir 30.

The basin 40 has an inner wall 50 and an outer wall 60, both of which are joined at least at a peripheral edge 45 of the basin (FIG. 2) and separated by a distance sufficient to allow the water 15 to flow therebetween. The outer wall 60 is open at a central portion 65 and is adapted for engaging the open top end 28 of the pedestal 20 for attaching the basin 40 thereto (FIGS. 3a and 3b). Preferably the outer wall 50 includes a downwardly-projecting flange 66 adapted to fit within the open top end 28 of the pedestal 20, such that water 15 flowing between the walls 50,60 is prevented from flowing between the basin 40 and the pedestal 20 thereby (FIG. 3b). At least one mechanical fastener 150 (FIG. 3b), such as a screw, may be used to fix the basin 40 to the pedestal 20. Alternately, the basin 40 may screw onto the pedestal 20 with a thread or other arrangement (not shown). The basin 40 is formed from a substantially rigid material, such as plastic, epoxy resin, fiberglass, plaster, or the like. Further, the basin 40 may include an insulating material 140, or be made from a material that is an effective heat insulator. Clearly both the basin 40 and the pedestal 20 are made from a substantially water-tight material.

The inner wall 50 has an aperture 56 formed therethrough, preferably through a central portion 55 thereof. Further, at least one drainage aperture 70 is formed in the inner wall 50 proximate the peripheral edge 45 of the basin 40. Preferably three such drainage apertures 70 are included at substantially 120 degree positions around the basin 40, the basin 40 being formed in a circular shape in plan view, as generally depicted in the drawings. Embodiments having more than one of the drainage apertures 70 preferably have all drainage apertures 70 formed into the inner wall 50 at substantially the same vertical height, such that all drainage apertures 70 are utilized simultaneously.

A water pump 80 is disposed within the reservoir 30 of the pedestal 20 for pumping water 15 from an input port 82 thereof to an output port 84 thereof. A basin supply conduit 90 is fixed at a bottom end 92 thereof with the output port 84 of the water pump 80. A top end 98 of the basin supply conduit 90 projects through the aperture 56 of the inner wall 50 of the basin 40. The water pump 80 further includes an energy source 100, such as an electrical cable 105 traversing the pedestal 20 through a water-tight seal 110 (FIG. 3a), or a battery recharged by a photovoltaic panel (not shown), or the like.

In use, water 15 contained in the reservoir 30 of the pedestal 20 is moved by the water pump 80 through the basin supply conduit 90 and into the basin 40. Once the water 15 reaches the at least one drainage aperture 70, the water 15 drains between the inner and outer walls 50,60, and flows through the central portion 65 of the outer wall and back into the reservoir 30, where the water pump 80 recirculates the water 15 back into the basin 40.

In a preferred embodiment of the invention, the top end 98 of the basin supply conduit 90 terminates vertically between the aperture 56 of the inner wall 50 and the at least one drainage aperture 70 (FIGS. 1 and 3a), such as within three centimeters thereof. As such, when the water pump 80 is deactivated, the water 15 remains in the basin 40 at the same level as the top end 98 of the basin supply conduit 90.

In an alternate embodiment of the invention, the top end 98 of the basin supply conduit 90 is substantially flush with the inner wall 50 of the basin 40 (FIGS. 2 and 3b). In such an embodiment, the basin supply conduit 90 further includes a check valve 120 therealong for preventing water 15 from flowing from the basin 40 to the reservoir 30 downwardly through the basin supply conduit 90. As such, when the water pump 80 is deactivated, the water 15 remains in the basin 40 at the same level as the at least one drainage aperture 70.

In yet another embodiment of the invention, the top end 98 of the basin supply conduit 90 is substantially flush with the inner wall 50 of the basin 40, and the check valve 120 is not included. In such an embodiment, when the energy source 100 is withdrawn from the water pump 80, water 15 in the basin 40 travels down the basin supply conduit 90 and through the deactivated water pump 80 to empty the basin 40 into the reservoir 30. As such, the water pump 80 may be deactivated at night, for example, and the water 15 in the basin 40 will drain into the reservoir 30 as quickly as allowed by gravity through the deactivated water pump 80. The reservoir 30, in such an embodiment, preferably has a capacity greater than the volume of the basin 40, such that the basin 40 may completely drain into the reservoir 30 without overflowing the reservoir 30. Alternately, the check valve 120 may be included to prevent all of the water 15 from draining out of the basin 40 into the reservoir 30. The top end 98 of the basin supply conduit 90 and each drainage aperture 70 may each further include a mosquito screen 130 (FIG. 3a) thereacross, such that the water 15 may pass therethrough but small insects (not shown) cannot.

While a particular form of the invention has been illustrated and described, it will be apparent that various modifications can be made without departing from the spirit and scope of the invention. For example, the shape of the basin 40 and pedestal 20 may be greatly altered from that shown in the figures. Further, the water pump 80 may be located away from the reservoir 30 and connected thereto with a water supply conduit (not shown), the aperture 56 of the inner wall 50 being sealed. In such an embodiment, the water 15 may be pumped into the basin 40 via a waterfall or the like from above the basin 40. Moreover, a water heater (not shown) can be added in either the basin or, preferably, away from view in the pedestal to prevent freezing of the water therein. Also, a section of the pedestal 20 may be transparent so the water level in the reservoir 30 may be readily observed. Accordingly, it is not intended that the invention be limited, except as by the appended claims.

What is claimed is:

1. A birdbath comprising:
   a substantially hollow pedestal forming a water reservoir therein and having an open top end and a sealed bottom end;

a basin having an inner wall and an outer wall, the inner wall being separated from the outer wall by a distance sufficient to allow a fluid to flow therebetween, the walls meeting at a peripheral edge of the basin, the outer wall open at a central portion thereof and adapted for engaging the open top end of the pedestal for fixing the basin to the pedestal, the inner wall having an aperture formed through a central portion thereof, at least one drainage aperture being formed in the inner wall proximate the peripheral edge of the basin; a water pump disposed within the reservoir of the pedestal for pumping water from an input port thereof to an output port thereof, a basin supply conduit being fixed at a bottom end, thereof to the output port of the water pump, a top end of the basin supply conduit projecting through the aperture of the inner wall of the basin, the water pump further including an energy source;

whereby water contained in the reservoir of the pedestal is moved, by the water pump through the basin supply conduit and into the basin, whereupon reaching the at least one drainage aperture the water drains between the inner and outer walls back into the reservoir.

2. The birdbath of claim 1 wherein the energy source of the water pump is an electrical cable traversing the pedestal through a water-tight seal.

3. The birdbath of claim 1 wherein the energy source of the water pump is powered by solar energy.

4. The birdbath of claim 1 wherein the top end of the basin supply conduit is substantially flush with the inner wall of the basin, and wherein the basin supply conduit further includes a check valve for preventing water from flowing from the basin to the reservoir down through the basin supply conduit.

5. The birdbath of claim 1 wherein the top end of the basin supply conduit terminates vertically between the aperture of the inner wall of the basin and the at least one drainage aperture.

6. The birdbath of claim 1 wherein the central portion of the outer wall includes a downwardly-projecting flange adapted to fit within the open top end of the pedestal, whereby water flowing between the inner wall and the outer wall is prevented from flowing between the basin and the pedestal by the flange.

7. The birdbath of claim 6 wherein the basin is fixed to the pedestal with at least one mechanical fastener.

8. The birdbath of claim 1 wherein the top end of the basin supply conduit is substantially flush with the inner wall of the basin, whereby when the energy source is withdrawn from the water pump, water in the basin travels down the basin supply conduit and water pump to empty the basin into the reservoir.

9. The birdbath of claim 8 wherein the top end of the basin supply conduit and each of the at least one drainage aperture include a mosquito screen thereacross, such that water may pass therethrough but small insects cannot.

10. The birdbath of claim 8 wherein the pedestal is formed from an insulating material, whereby water within the reservoir is inhibited from freezing when the ambient temperature drops below freezing.

11. The birdbath of claim 10 wherein the basin is formed from the insulating material.

12. A birdbath comprising:

a substantially hollow pedestal forming a water reservoir therein and having an open top end and a sealed bottom end;

a basin having an inner wall and an outer wall, the walls meeting at a peripheral edge of the basin, the outer wall open at a central portion thereof and adapted for engaging the open top end of the pedestal for fixing the basin to the pedestal, the inner wall having an aperture formed through a central portion thereof, at least one drainage aperture being formed in the inner wall proximate the peripheral edge of the basin; a water pump disposed within the reservoir of the pedestal for pumping water from an input port thereof to an output port thereof, a basin supply conduit being fixed at a bottom end, thereof to the output port of the water pump, a top end of the basin supply conduit projecting through the aperture of the inner wall of the basin, the water pump further including an energy source;

whereby water contained in the reservoir of the pedestal is moved, by the water pump through the basin supply conduit and into the basin, whereupon reaching the at least one drainage aperture the water drains between the inner and outer walls back into the reservoir, wherein the top end of the basin supply conduit terminates vertically between the aperture of the inner wall of the basin and the at least one drainage aperture.

13. The birdbath of claim 12 wherein the energy source of the water pump is an electrical cable traversing the pedestal through a water-tight seal.

14. The birdbath of claim 12 wherein the energy source of the water pump is powered by solar energy.

15. The birdbath of claim 12 wherein the central portion of the outer wall includes a downwardly-projecting flange adapted to fit within the open top end of the pedestal, whereby water flowing between the inner wall and the outer wall is prevented from flowing between the basin and the pedestal by the flange.

16. The birdbath of claim 15 wherein the basin is fixed to the pedestal with at least one mechanical fastener.

* * * * *